United States Patent
Lin

(10) Patent No.: US 11,662,978 B2
(45) Date of Patent: May 30, 2023

(54) MODULAR OPERATION CIRCUIT ADOPTING ITERATIVE CALCULATIONS

(71) Applicant: PUFsecurity Corporation, Hsinchu County (TW)

(72) Inventor: Wen-Ching Lin, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 127 days.

(21) Appl. No.: 17/103,981

(22) Filed: Nov. 25, 2020

(65) Prior Publication Data

US 2021/0382688 A1 Dec. 9, 2021

Related U.S. Application Data

(60) Provisional application No. 63/034,410, filed on Jun. 4, 2020.

(51) Int. Cl.
| | |
|---|---|
| *G06F 7/487* | (2006.01) |
| *G06F 7/499* | (2006.01) |
| *G06F 7/485* | (2006.01) |
| *H04L 9/08* | (2006.01) |
| *H04L 9/32* | (2006.01) |

(52) U.S. Cl.
CPC ............ *G06F 7/4876* (2013.01); *G06F 7/485* (2013.01); *G06F 7/4873* (2013.01); *G06F 7/49968* (2013.01); *H04L 9/0869* (2013.01); *H04L 9/3278* (2013.01); *H04L 2209/12* (2013.01); *H04L 2209/16* (2013.01)

(58) Field of Classification Search
CPC . G06F 7/72; G06F 7/722; G06F 7/724; G06F 7/727; G06F 7/728; G06F 7/729; G06F 7/4876; G06F 7/485; G06F 7/4873; G06F 7/49968; G06F 7/52; G06F 7/535; H04L 9/0869; H04L 9/3278; H04L 2209/12; H04L 2209/16
See application file for complete search history.

(56) References Cited

U.S. PATENT DOCUMENTS

| | | | |
|---|---|---|---|
| 7,627,114 B2 | 12/2009 | Chen | |
| 8,229,109 B1 | 7/2012 | Hasenplaugh | |
| 2004/0066934 A1* | 4/2004 | Chen | G06F 7/722 |
| | | | 380/30 |
| 2013/0236006 A1* | 9/2013 | Bockes | G09C 1/00 |
| | | | 380/28 |

FOREIGN PATENT DOCUMENTS

| | | |
|---|---|---|
| CN | 1258710 C | 6/2006 |
| TW | 200404223 | 3/2004 |

* cited by examiner

*Primary Examiner* — Matthew D Sandifer
*Assistant Examiner* — Huy Duong
(74) *Attorney, Agent, or Firm* — Winston Hsu

(57) ABSTRACT

A modular operation circuit includes a controller, a modular multiplier and a modular adder. The controller divides a first number into K segments. The modular multiplier performs modular multiplication operations and the modular adder performs modular addition operations to the K segments in (K−1) iterations for deriving a remainder of a division of the first number by a second number.

20 Claims, 2 Drawing Sheets

MODULAR OPERATION CIRCUIT ADOPTING ITERATIVE CALCULATIONS

CROSS REFERENCE TO RELATED APPLICATIONS

This non-provisional application claims priority of U.S. provisional application No. 63/034,410, filed on Jun. 4, 2020, included herein by reference in its entirety.

BACKGROUND OF THE INVENTION

1. Field of the Invention

The present invention is related to a modular operation circuit, and more particularly to a modular operation circuit adopting iterative calculations.

2. Description of the Prior Art

The modular or modulo operations are widely used in cryptosystems. For example, most of the algorithms for key generation or digital signature require modular operations. Usually, the modular operation is performed by using a divider, and the remainder is obtained after the division is completed. However, the hardware for implementing a divider is very complicate and requires a significant area. Furthermore, if the cryptosystem needs to perform modular operations for numbers of greater values, the divider will also require greater area, making the implementation of the cryptosystem uneconomic.

SUMMARY OF THE INVENTION

One embodiment of the present invention discloses a method for operating a modular operation circuit to derive a remainder of a division of a first number by a second number. The modular operation circuit includes a controller, a modular multiplier and a modular adder.

The method includes the controller dividing the first number into K segments, during a first iteration, the modular multiplier performing a first modular multiplication operation to generate a first intermediate result according to a first segment of the K segments and a first base number, and the modular adder performing a first modular addition operation to generate a first iteration remainder according to the first intermediate result and a second segment of the K segments, and during a second iteration, the modular multiplier performing a second modular multiplication operation to generate a second intermediate result according to the first iteration remainder and a second base number, and the modular adder performing a second modular addition operation to generate a second iteration remainder according to the second intermediate result and a third segment of the K segments.

K is an integer greater than 2, and each of the K segments has a bit length smaller than or equal to a third number. The third number is a rounding-up result of logarithm of the second number to base 2, the first base number is calculated according to a first exponential value of a bit length of the second segment with a base of 2, and the second base number is calculated according to a second exponential value of a bit length of the third segment with a base of 2.

Another embodiment of the present invention discloses a modular operation circuit for deriving a remainder of a division of a first number by a second number. The modular operation circuit includes a controller, a modular multiplier, and a modular adder.

The controller divides a first number (A) into K segments, where K is an integer greater than 2, and each of the K segments has a bit length smaller than or equal to a third number.

The modular multiplier is coupled to the controller. The modular multiplier performs a first modular multiplication operation to generate a first intermediate result according to a first segment of the K segments and a first base number during a first iteration, and performs a second modular multiplication operation to generate a second intermediate result according to a first iteration remainder and a second base number during a second iteration.

The modular adder is coupled to the controller. The modular adder performs a first modular addition operation to generate the first iteration remainder according to the first intermediate result and a second segment of the K segments during the first iteration, and performs a second modular addition operation to generate a second iteration remainder according to the second intermediate result and a third segment of the K segments during the second iteration.

The third number is a rounding-up result of a logarithm of the second number to base 2. The first base number is calculated according to a first exponential value of a bit length of the second segment with a base of 2, and the second base number is calculated according to a second exponential value of a bit length of the third segment with a base of 2.

Another embodiment of the present invention discloses a method for operating a modular operation circuit to derive a remainder of a division of a first number by a second number. The modular operation circuit includes a controller, a modular multiplier and a modular adder.

The method includes the controller dividing the first number into two segments, during a first iteration, the modular multiplier performing a first modular multiplication operation to generate a first intermediate result according to a first segment of the two segments and a first base number, and the modular adder performing a first modular addition operation to generate a first iteration remainder according to the first intermediate result and a second segment of the two segments, and the controller outputting the first iteration remainder as the remainder of the division of the first number by the second number. Each of the two segments has a bit length smaller than or equal to a third number. The third number is a rounding-up result of logarithm of the second number to base 2, and the first base number is calculated according to a first exponential value of a bit length of the second segment with a base of 2.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
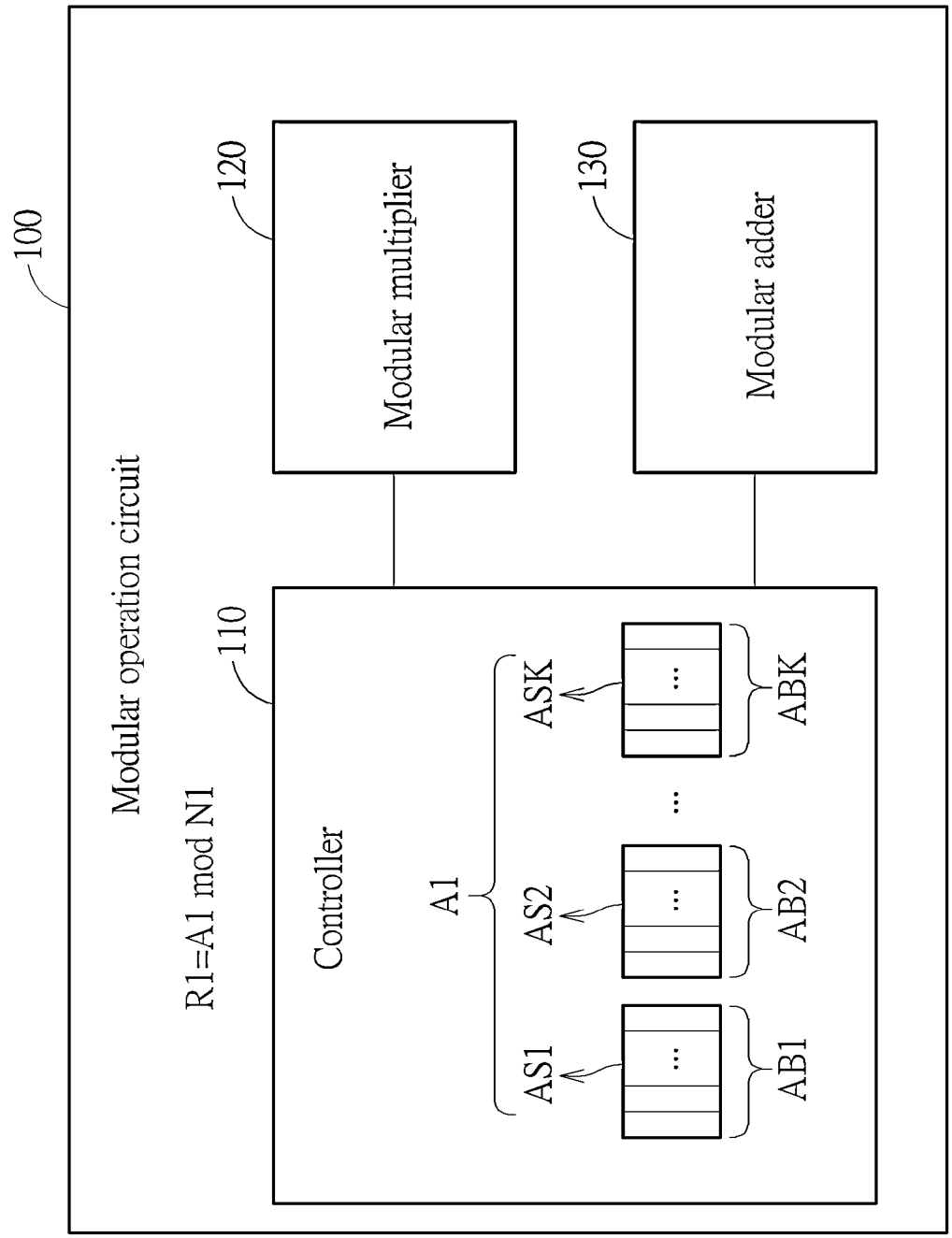
FIG. 1 shows a modular operation circuit according to one embodiment of the present invention.

FIG. 1 shows a modular operation circuit 100 according to one embodiment of the present invention. The modular operation circuit 100 includes a controller 110, a modular multiplier 120 and a modular adder 130. In some embodiments, the modular operation circuit 100 can be used to derive a remainder R1 of a division of a first number A1 by a second number N1.

In FIG. 1, the modular multiplier 120 and the modular adder 130 are coupled to the controller 110. The modular multiplier 120 can perform a modular multiplication operation by multiplying two input numbers and outputting the remainder of a division of the product of the multiplication by another input number. The modular adder 130 can perform a modular addition operation by adding two input numbers and outputting the remainder of a division of the sum of the addition by another input number. Also, the controller 110 can control the data flow of the modular multiplier 120 and the modular adder 130.

In some embodiments, the controller 110 can divide the first number A1 into K segments AS1 to ASK, where K can be an integer greater than or equal to 2. Also, in some embodiments, to keep the area of the modular operation circuit 100 within a desired range, each of the K segments AS1 to ASK may have a bit length smaller than or equal to a third number n1. The third number n1 can be a rounding-up result of logarithm of the second number N1 to base 2, that is, n1 can be a rounding-up result of $\log_2 N1$. In FIG. 1, the bit lengths AB1 to ABK of the segments AS1 to ASK can be the same; however, in some other embodiments, at least two of the bit lengths AB1 to ABK can be different.

As the first number A1 is divided into the K segments AS1 to ASK, the first number A1 can be represented by formula (1) as below.

$$A1 = AS1 \times 2^{(AB2+AB3+\ldots+ABK)} + AS2 \times 2^{(AB3+\ldots+ABK)} + \ldots + ASK = \sum_{i=1}^{K-1}(ASi \times 2^{\sum_{j=i+1}^{K} ABj}) + ASK \quad \text{formula (1)}$$

With formula (1), the first number A1 can further be represented in a recursive manner as shown in formulas (2) to (7), where k is an integer greater than 3 and smaller than (K−1).

$$A1 = \{[(AS1 \times 2^{AB2} + AS2) \times 2^{AB3} + AS3] 2^{AB4} + AS4\} \times 2^{AB5} \ldots + ASK \quad \text{formula (2)}$$

$$T1 = AS1 \times 2^{AB2} + AS2; \quad \text{formula (3)}$$

$$T2 = T1 \times 2^{AB3} + AS3; \quad \text{formula (4)}$$

$$T3 = T2 \times 2^{AB4} + AS4; \quad \text{formula (5)}$$

$$Tk = T(k-1) \times 2^{AB(k+1)} + AS(k+1) \quad \text{formula (6)}$$

$$T(K-1) = T(K-2) \times 2^{ABK} + ASK = A1 \quad \text{formula (7)}$$

In this case, the complicate modular operation for the first number A1 can be divided into several simplified modular operations for the iteration values T1, T2, to T(K−1) having smaller values. That is, the modular operation for deriving the remainder R1 can be performed by (K−1) iterations with the modular multiplier 120 and a modular adder 130, and thus, the complicate division circuit used for performing the modular operation to numbers of great values is no longer necessary.

However, in some embodiments, K can be equal to 2. That is, the first number A1 can be divided into 2 segments AS1 and AS2. In this case, the modulation operation for deriving the remainder R1 may not require multiple iterative operations. That is, the modular operation for the iteration value T1 can be derived as the remainder R1.

Figure 2:
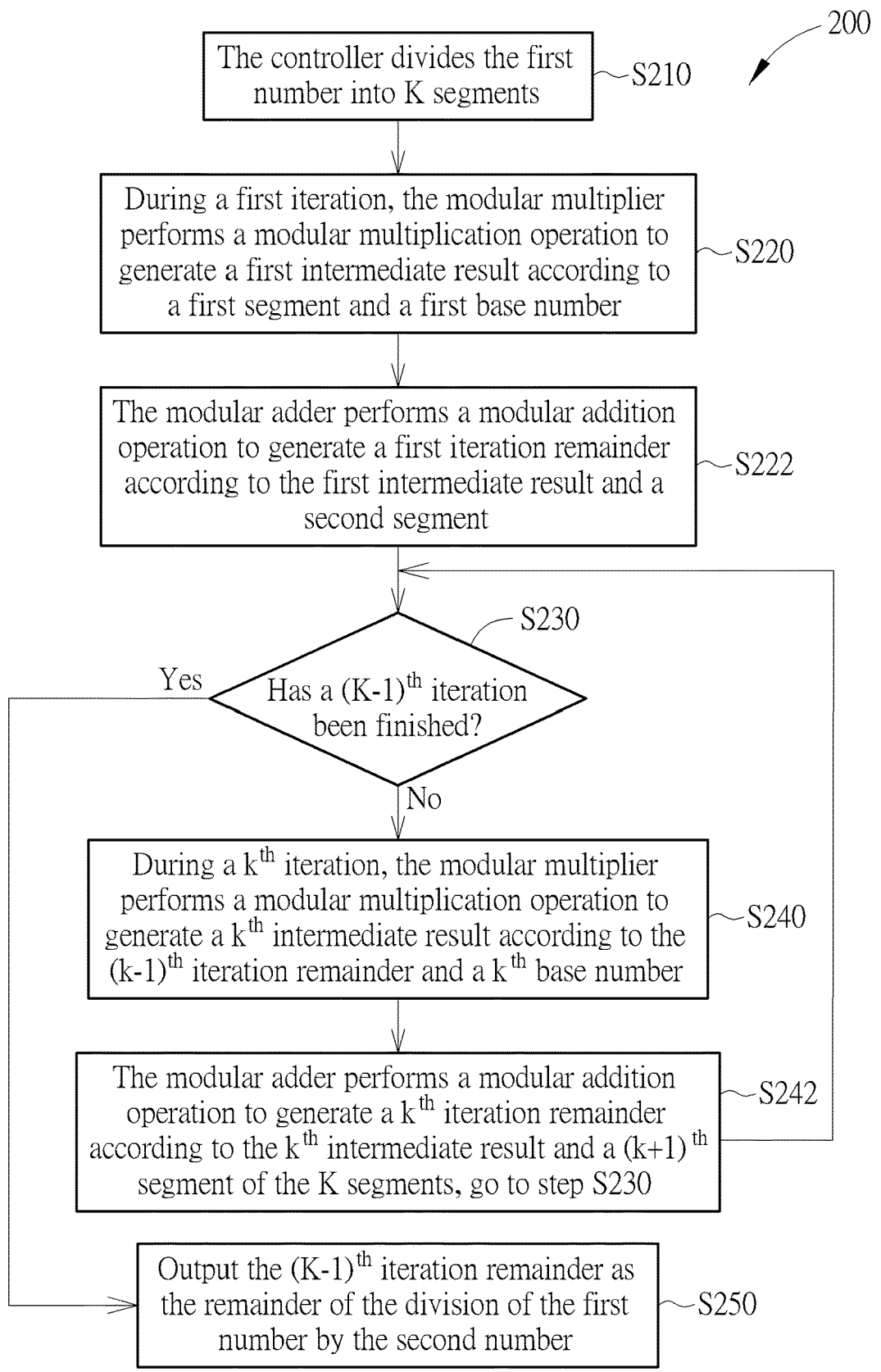
FIG. 2 shows a flowchart of a method for operating the modular operation circuit in FIG. 1.

FIG. 2 shows a method 200 for operating the modular operation circuit 100 to derive the remainder R1. The method 200 includes steps S210 to S250.

S210: the controller 110 divides the first number A1 into K segments AS1 to ASK;

S220: during a first iteration, the modular multiplier 120 performs a modular multiplication operation to generate a first intermediate result ITM1 according to a first segment AS1 and a first base number B1;

S222: the modular adder 130 performs a modular addition operation to generate a first iteration remainder ITR1 according to the first intermediate result ITM1 and a second segment AS2;

S230: if a $(K-1)^{th}$ iteration has been finished, go to step S250, otherwise go to step S240;

S240: during a $k^{th}$ iteration, the modular multiplier 120 performs a modular multiplication operation to generate a $k^{th}$ intermediate result according to the $(k-1)^{th}$ iteration remainder and a $k^{th}$ base number;

S242: the modular adder 130 performs a modular addition operation to generate a $k^{th}$ iteration remainder according to the $k^{th}$ intermediate result and a $(k+1)^{th}$ segment of the K segments, go to step S230; and S250: output the $(K-1)^{th}$ iteration remainder as the remainder R1 of the division of the first number A1 by the second number N1.

After the first number A1 is divided into the K segments AS1 to ASK in step S210, a modular operation can be performed to the iteration value T1 in steps S220 and S222. For example, in step S220, the modular multiplier 120 can perform a modular multiplication operation to generate a first intermediate result ITM1 according to the first segment AS1, the first base number B1 and the second number N1. The first intermediate result ITM1 can be represented by formula (8) as below.

$$ITM1 = (AS1 \times B1) \bmod N1 \quad \text{formula (8)}$$

That is, the modular multiplier 120 can multiply the first segment AS1 with the first base number B1 to generate a multiplication result and generate the first intermediate result ITM1 by deriving the remainder of the division of the multiplication result by the second number N1.

In some embodiments, the first base number B1 can be the exponential value of the bit length AB2 of the second segment AS2 with a base of 2, that is, the first base number B1 can be represented as $2^{AB2}$. However, in some embodiments, to ensure that the value of AS1×B1 is within the computation capability of the modular multiplier 120, the first base number B1 can be the remainder of a division of the first exponential value $2^{AB2}$ by the second number N1 that is, the first base number B1 can be $2^{AB2} \bmod N1$.

Also, in step S222, the modular adder 130 can perform a modular addition operation to generate a first iteration remainder ITR1 according to the first intermediate result ITM1, a second segment AS2 and the second number N1. The first iteration remainder ITR1 can be represented by formula (9) as below.

$$ITR1 = (ITM1 + AS2) \bmod N1 = [(AS1 \times B1) \bmod N1 + AS2] \bmod N1 \quad \text{formula (9)}$$

That is, the modular adder 130 can add the first intermediate result ITM1 and the second segment AS2 to generate a sum and generate the first iteration remainder ITR1 by deriving the remainder of the division of the sum by the second number N1.

After the step S220 and S222, the remainder ITR1 of the division of the iteration value T1 by the second number N1 can be obtained, and the first iteration remainder ITR1 can be used for the next iteration. For example, in step S240, during the second iteration, the modular multiplier 120 can perform a modular multiplication operation to generate a second intermediate result ITM2 according to the first iteration remainder ITR1 and the second base number B2. The second intermediate result ITM2 can be represented by formula (10) as below.

$$ITM2 = (ITR1 \times B2) \bmod N1 \quad \text{formula (10)}$$

In some embodiments, the second base number B2 can be calculated according to the exponential value of the bit length AB3 of the third segment AS3 with a base of 2, that is, the second base number B2 can be represented as $2^{AB3}$. However, in some embodiments, to ensure that the value of ITR1×B2 is within the computation capability of the modular multiplier 120, the second base number B2 can be the remainder of a division of the second exponential value $2^{AB3}$ by the second number N1, that is, the second base number B2 can be $2^{AB3} \bmod N1$.

Also, in step S242, the modular adder 130 can perform a modular addition operation to generate a second iteration remainder ITR2 according to the second intermediate result ITM2 and the third segment AS3. The second iteration remainder ITR2 can be represented by formula (11) as below.

$$ITR2 = (ITM2 + AS3) \bmod N1 \quad \text{formula (11)}$$

After the step S240 and S242, the remainder ITR2 of the division of the iteration value T2 by the second number N1 can be obtained, and the second iteration remainder ITR2 can be used for the next iteration, and so on. Finally, after the $(K-)^{th}$ iteration is completed, step S230 will stop the further iteration and modular operation circuit 100 can output the $(K-1)^{th}$ iteration remainder as the remainder R1 of the division of the first number A1 by the second number N1 in step S250.

In some embodiments, to keep the size of the modular operation circuit 100 within the acceptable range, the computation capability of the modular multiplier 120 and the modular adder 130 may be fixed. For example, the modular multiplier 120 and the modular adder 130 may only be able to process numbers with bit lengths equal to or smaller than the third number n1. Therefore, if the bit length AB1 of the first segment AS1 is smaller than the third number n1, then formula (8) can be performed by the modular multiplier 120 directly.

However, if the bit length AB1 of the first segment AS1 is equal to the third number n1, then the computation may go beyond the capability of the modular multiplier 120. To ensure the correctness of the computation result, a modular operation can be performed to the first segment AS1 before the modular multiplier 120 performs the modular multiplication operation. In some embodiments, to reuse the hardware and reduce the area of the modular operation circuit 100, the modular adder 130 can be used to perform the modular operation. For example, the modular adder 130 can perform a modular addition operation to the first segment AS1 and zero to generate a processed input number PI1, and the modular multiplier 120 would multiply the processed input number PI1 with the first base number B1 to generate a multiplication result and generate the first intermediate result ITM1 by deriving the remainder of the division of the multiplication result by the second number N1. That is, if the bit length AB1 of the first segment AS1 is equal to the third number n1, then, instead of formula (8), formula (12) would be performed in step S220.

$$ITM1 = (PI1 \times B1) \bmod N1 = [(AS1 \bmod N1) \times B1] \bmod N1 \quad \text{formula (12)}$$

Similarly, if the bit length AB2 of the second segment AS2 is smaller than the third number n1, then formula (9) can be performed by the modular adder 130 directly.

However, if the bit length AB2 of the second segment AS2 is equal to the third number n1, then the computation may go beyond the capability of the modular adder 130. To ensure the correctness of the computation result, a modular operation can be performed to the second segment AS2 before the modular adder 130 performs the modular addition operation. In some embodiments, to reuse the hardware and reduce the area of the modular operation circuit 100, the modular adder 130 can be used to perform the modular operation. For example, the modular adder 130 can perform a modular addition operation to second segment AS2 and zero to generate a processed input number PI2, and the modular adder 130 would add the first intermediate result ITM1 and the processed input number PI2 to generate a sum and generate the first iteration remainder ITR1 by deriving the remainder of the division of the sum by the second number N1. That is, if the bit length AB2 of the second segment AS2 is equal to the third number n1, then, instead of formula (9), formula (13) would be performed in step S222.

$$ITR1 = (ITM1 + PI2) \bmod N1 = [ITM1 + (AS2 \bmod N1)] \bmod N1 \quad \text{formula (13)}$$

In some embodiments, the method 200 can further include steps for the controller 130 to determine whether the bit lengths of the segments AS1 to ASK are smaller than the third number n1 or equal to the third number n1. Therefore, if the computation goes beyond the capability of the modular multiplier 120 or the modular adder 130, then the additional modular operations can be performed to the segments AS1 to ASK before being processed by the modular multiplier 120 and the modular adder 130, ensuring the calculation result of the modular operation circuit 100 to be correct.

In summary, the modular operation circuit and the method for operating the modular operation circuit provided by the embodiments of the present invention can perform the modular operation with multiple iterations using a modular multiplier and a modular adder. Therefore, the complicate division circuit used for performing the modular operation to numbers of great values can be saved, and the area of the modular operation circuit can be reduced significantly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for operating a modular operation circuit to derive a remainder of a division of a first number by a second number in a cryptosystem, the modular operation circuit comprising a controller, a modular multiplier and a modular adder, the method comprising:

the controller dividing the first number into K segments;
during a first iteration:
the modular multiplier performing a first modular multiplication operation to generate a first intermediate result according to a first segment of the K segments and a first base number; and the modular adder performing a first modular addition operation to generate a first iteration remainder according to the first intermediate result and a second segment of the K segments; and during a second iteration:

the modular multiplier performing a second modular multiplication operation to generate a second intermediate result according to the first iteration remainder and a second base number; and the modular adder performing a second modular addition operation to generate a second iteration remainder according to the second intermediate result and a third segment of the K segments;

wherein:

K is an integer greater than 2;

each of the K segments has a bit length smaller than or equal to a third number;

the third number is a rounding-up result of logarithm of the second number to base 2;

the first base number is calculated according to a first exponential value of a bit length of the second segment with a base of 2; and the second base number is calculated according to a second exponential value of a bit length of the third segment with a base of 2.

2. The method of claim 1 further comprising:
the controller outputting a $(K-1)^{th}$ iteration remainder as the remainder of the division of the first number by the second number after a $(K-1)^{th}$ iteration is performed.

3. The method of claim 1, wherein the K segments have a same bit length.

4. The method of claim 1, wherein at least two of the K segments have different bit lengths.

5. The method of claim 1, wherein:
the first base number is a remainder of a division of the first exponential value by the second number; and
the second base number is a remainder of a division of the second exponential value by the second number.

6. The method of claim 1, wherein:
a bit length of the first segment is smaller than the third number; and
the modular multiplier performing the first modular multiplication operation to generate the first intermediate result according to the first segment of the K segments and the first base number comprises:
the modular multiplier multiplying the first segment with the first base number to generate a multiplication result; and
the modular multiplier generating the first intermediate result by deriving a remainder of a division of the multiplication result by the second number.

7. The method of claim 1, wherein:
a bit length of the first segment is equal to the third number; and
the modular multiplier performing the first modular multiplication operation to generate the first intermediate result according to the first segment of the K segments and the first base number comprises:
the modular adder performing a third modular addition operation to first segment and zero to generate a first processed input number;
the modular multiplier multiplying the first processed input number with the first base number to generate a multiplication result; and the modular multiplier generating the first intermediate result by deriving a remainder of a division of the multiplication result by the second number.

8. The method of claim 1, wherein:
a bit length of the second segment is smaller than the third number; and
the modular adder performing the first modular addition operation to generate the first iteration remainder according to the first intermediate result and the second segment of the K segments comprises:
the modular adder adding the first intermediate result and the second segment to generate a sum; and
the modular adder generating the first iteration remainder by deriving a remainder of a division of the sum by the second number.

9. The method of claim 1, wherein:
a bit length of the second segment is equal to the third number; and
the modular adder performing the first modular addition operation to generate the first iteration remainder according to the first intermediate result and the second segment of the K segments comprises:
the modular adder performing a fourth modular addition operation to the second segment and zero to generate a second processed input number;
the modular adder adding the first intermediate result and the second processed input number to generate a sum; and
the modular adder generating the first iteration remainder by deriving a remainder of a division of the sum by the second number.

10. The method of claim 1 further comprising:
the controller determining whether a bit length of the first segment is smaller than the third number or equal to the third number; and
the controller determining whether a bit length of the second segment is smaller than the third number or equal to the third number.

11. A modular operation circuit for deriving a remainder of a division of a first number by a second number in a cryptosystem, the modular operation circuit comprising:
a controller configured to divide the first number into K segments;
a modular multiplier coupled to the controller and configured to perform a first modular multiplication operation to generate a first intermediate result according to a first segment of the K segments and a first base number during a first iteration, and perform a second modular multiplication operation to generate a second intermediate result according to a first iteration remainder and a second base number during a second iteration; and
a modular adder coupled to the controller and configured to perform a first modular addition operation to generate the first iteration remainder according to the first intermediate result and a second segment of the K segments during the first iteration, and perform a second modular addition operation to generate a second iteration remainder according to the second intermediate result and a third segment of the K segments during the second iteration;

wherein:

K is an integer greater than 2;

each of the K segments has a bit length smaller than or equal to a third number;

the third number is a rounding-up result of a logarithm value of the second number to base 2;

the first base number is calculated according to a first exponential value of a bit length of the second segment with a base of 2; and the second base number is calculated according to a second exponential value of a bit length of the third segment with a base of 2.

12. The modular operation circuit of claim 11, wherein the controller is further configured to output a $(K-1)^{th}$ iteration remainder as the remainder of the division of the first number by the second number after a $(K-1)^{th}$ iteration is performed.

13. The modular operation circuit of claim 11, wherein the K segments have a same bit length.

14. The modular operation circuit of claim 11, wherein at least two of the K segments have different bit lengths.

15. The modular operation circuit of claim 11, wherein:
the first base number is a remainder of a division of the first exponential value by the second number; and
the second base number is a remainder of a division of the second exponential value by the second number.

16. The modular operation circuit of claim 11, wherein:
a bit length of the first segment is smaller than the third number; and
the modular multiplier performs the first modular multiplication operation to generate the first intermediate result by multiplying the first segment with the first base number to generate a multiplication result and deriving a remainder of a division of the multiplication result by the second number as the first intermediate result.

17. The modular operation circuit of claim 11, wherein:
a bit length of the first segment is equal to the third number;
the modular adder is further configured to perform a third modular addition operation to first segment and zero to generate a first processed input number; and
the modular multiplier performs the first modular multiplication operation to generate the first intermediate result by multiplying the first processed input number with the first base number to generate a multiplication result and deriving a remainder of a division of the multiplication result by the second number as the first intermediate result.

18. The modular operation circuit of claim 11, wherein:
a bit length of the second segment is smaller than the third number; and
the modular adder performs the first modular addition operation to generate the first iteration remainder by adding the first intermediate result and the second segment to generate a sum and deriving a remainder of a division of the sum by the second number.

19. The modular operation circuit of claim 11, wherein:
a bit length of the second segment is equal to the third number; and
the modular adder performs the first modular addition operation to generate the first iteration remainder by performing a fourth modular addition operation to second segment and zero to generate a second processed input number, adding the first intermediate result and the second processed input number to generate a sum, and deriving a remainder of a division of the sum by the second number.

20. The modular operation circuit of claim 11, wherein the controller is further configured to determine whether a bit length of the first segment is smaller than the third number or equal to the third number, and determine whether a bit length of the second segment is smaller than the third number or equal to the third number.

* * * * *